United States Patent
Alman et al.

(10) Patent No.: US 8,820,704 B2
(45) Date of Patent: Sep. 2, 2014

(54) GUIDE MEMBER FOR USE IN A VALVE ACTUATOR ASSEMBLY

(75) Inventors: Paul T. Alman, Marshalltown, IA (US); Hanbing Lu, Tianjin (CN)

(73) Assignee: Fisher Controls International LLC, Marshalltown, IA (US)

(*) Notice: Subject to any disclaimer, the term of this patent is extended or adjusted under 35 U.S.C. 154(b) by 92 days.

(21) Appl. No.: 13/546,878

(22) Filed: Jul. 11, 2012

(65) Prior Publication Data
US 2013/0277596 A1  Oct. 24, 2013

(30) Foreign Application Priority Data
Apr. 20, 2012 (CN) .......................... 2012 1 0124604

(51) Int. Cl.
*F16K 31/00* (2006.01)
(52) U.S. Cl.
USPC .......................................... 251/61.5; 251/61
(58) Field of Classification Search
USPC ............... 251/61, 61.2, 61.4, 63.5, 63.6, 331, 251/335.2
See application file for complete search history.

(56) References Cited

U.S. PATENT DOCUMENTS

| | | | | |
|---|---|---|---|---|
| 387,851 A | * | 8/1888 | Braggins ............................. | 236/8 |
| 853,541 A | * | 5/1907 | Eddy ............................ | 236/92 B |
| 1,585,479 A | * | 5/1926 | Fisher ........................... | 251/61.4 |
| 1,985,600 A | * | 12/1934 | Collins ............................. | 251/61 |
| 2,012,258 A | * | 8/1935 | Christensen .................... | 303/26 |
| 2,903,011 A | | 9/1959 | Long | |
| 4,295,489 A | * | 10/1981 | Arends et al. ................. | 137/488 |
| 2008/0078460 A1 | | 4/2008 | Roper et al. | |
| 2008/0217567 A1 | | 9/2008 | Dalluge | |

FOREIGN PATENT DOCUMENTS

JP  2007-048145 A  2/2007

OTHER PUBLICATIONS

International Search Report for PCT/US2012/046273, mailed Nov. 14, 2012.
Written Opinion for PCT/US2012/046273, mailed Nov. 14, 2012.

* cited by examiner

*Primary Examiner* — John K Fristoe, Jr.
*Assistant Examiner* — Umashankar Venkatesan
(74) *Attorney, Agent, or Firm* — Marshall, Gerstein & Borun LLP

(57) ABSTRACT

A valve actuator assembly includes a housing having a diaphragm plate and diaphragm disposed within the housing. A stem projection downwardly extends from a bottom surface of the diaphragm plate, and the stem projection is coupled to an actuator stem disposed along a longitudinal axis. A guide member has a top wall and a center aperture that receives the stem projection, and the top wall is biased into engagement with the bottom surface of the diaphragm plate by a spring. The guide member also has a side wall that downwardly extends from the top wall, and an outer surface of the side wall is adapted to engage an inner surface of a spring housing to limit displacement of the diaphragm plate and the actuator stem in a direction normal to the longitudinal axis.

14 Claims, 3 Drawing Sheets

GUIDE MEMBER FOR USE IN A VALVE ACTUATOR ASSEMBLY

FIELD OF THE INVENTION

The present invention relates generally to valve assemblies. More specifically, the present invention relates to a guide member for use in a valve actuator assembly.

BACKGROUND OF THE INVENTION

Automated control valves such as, for example, cage guided control valves, are often used in process control plants or systems to control the flow of process fluids. A cage-guided control valve typically includes an actuator (e.g., a pneumatic actuator, an electric actuator, a hydraulic actuator, etc.) operatively coupled to a first end of a valve shaft that extends along a longitudinal axis. Typically, the actuator includes an actuator housing that comprises an upper actuator casing and a lower actuator casing, and a diaphragm is secured between the upper and lower actuator casings of the actuator housing. A diaphragm plate is disposed below the diaphragm within an interior volume of the lower actuator casing, and a first end of the valve shaft is coupled to a bottom portion of the diaphragm plate. When pressurized fluid is introduced into the interior volume of the lower actuator casing and/or an interior volume of the upper actuator casing, the diaphragm plate displaces. The displacement of the diaphragm plate displaces the valve shaft along the longitudinal axis, which in turn displaces a valve plug secured to a second end of the valve shaft, thereby opening and closing the valve. Because the interior volume of the lower actuator casing is adapted to receive pressurized fluid, an air-tight seal must be maintained between the valve stem and the portion of the lower actuator casing that accepts the valve stem. This air-tight seal limits or prevents the valve shaft (and the diaphragm plate) from displacing relative to the actuator housing in a direction normal to the longitudinal axis.

Frequently, only the interior volume of the upper actuator casing receives pressurized fluid to displace the valve shaft along the longitudinal axis. Because the interior volume of the lower actuator casing does not receive pressurized fluid, no air-tight seal is necessary between the valve stem and the portion of the lower actuator casing that accepts the valve stem. In this case, the valve stem and the diaphragm plate may transversely displace relative to the actuator housing. Such transverse displacement of the valve stem and the diaphragm plate relative to the actuator housing may damage any of all of the parts due to mutual contact. For example, such contact may create friction and/or may cause the diaphragm plate to crimp or deform the diaphragm. This transverse displacement may also result in positioner failures, packing failures, and other general performance issues.

To prevent such transverse displacement, especially in valves that are used in seismic service, such as nuclear applications, an upper guide may be disposed within the interior volume of the upper actuator casing to stabilize the valve shaft and the diaphragm plate relative to the actuator housing. However, such an upper guide requires a specially casted diaphragm plate and/or an upper actuator housing, a modified valve stem, as well as the use of a bushing and additional seals. Moreover, the upper guide adds weight and changes the center of gravity of the actuator assembly, both of which are undesirable in seismic environments.

BRIEF SUMMARY OF THE DISCLOSURE

In accordance with one exemplary aspect of the present invention, a valve actuator assembly having an upper actuator casing, a lower actuator casing coupled to the upper actuator casing, the lower actuator casing having a spring aperture, and a diaphragm disposed between the upper actuator casing and the lower actuator casing. A diaphragm plate is disposed between the diaphragm and the lower actuator casing, and the diaphragm plate has a top surface and a bottom surface. A stem projection downwardly extends from the bottom surface of the diaphragm plate, and a lower surface of the diaphragm engages the top surface of the diaphragm plate. The valve actuator assembly also includes a spring housing extending along a longitudinal axis, and the spring housing has an inner surface defining an interior volume. The spring housing also has an open first end, and the open first end of the spring housing is coupled to the lower actuator casing adjacent to the spring aperture. An actuator stem extends along the longitudinal axis and is secured to the stem projection of the diaphragm plate such that a displacement of the diaphragm plate results in a longitudinal displacement of the actuator stem. The actuator stem extends through the spring aperture of the lower actuator casing and at least partially into the interior volume of the spring housing. The valve actuator assembly further includes a guide member having a first end and a second end, the guide member having a side wall that extends along the longitudinal axis from the first end to the second end. The guide member includes a top wall disposed normal to the longitudinal axis at the first end of the guide member, and the top wall has a center aperture. At least a portion of the side wall adjacent to the second end of the guide member is received into the spring aperture of the lower actuator casing and within the interior volume of the spring housing. The valve actuator assembly additionally includes a spring having a first end and a second end, the second end of the spring being fixed relative to the spring housing and the first end of the spring engaging a bottom surface of the top wall of the guide member. The spring biases the top wall of the guide member into engagement with the bottom surface of the diaphragm plate such that the stem projection is received into the center aperture of the top wall of the guide member. An outer surface of the side wall of the guide member is adapted to engage the inner surface of the spring housing to limit displacement of the diaphragm plate and the actuator stem in a direction normal to the longitudinal axis.

In accordance with a further exemplary aspect of the present invention, a guide member for use in a valve actuator assembly to stabilize an actuator stem includes a top wall disposed at a first end of the guide member, the top wall extending in a direction normal to a longitudinal axis. The top wall has a center aperture that is adapted to receive the actuator stem such that the guide member is prevented from displacing relative to the actuator stem in a direction normal to the longitudinal axis. The guide member further includes a side wall extending along the longitudinal axis from the top wall at the first end of the guide member to an open second end of the guide member. The guide wall has an outer surface, and a portion of the outer surface of the guide wall is adapted to engage a portion of an inner surface of a spring housing to limit displacement of the actuator stem in a direction normal to the longitudinal axis.

In accordance with another exemplary aspect of the present invention, a method of assembling a valve includes disposing a diaphragm plate within a volume defined by an upper actuator casing and a lower actuator casing. The method further includes operatively connecting the diaphragm plate to a valve stem, wherein the valve stem is adapted to translate along a longitudinal axis. A spring is disposed in a spring housing coupled to the lower actuator casing, and the spring biases a guide member into engagement with a bottom surface of the diaphragm plate. The method also includes limiting the displacement of the diaphragm plate and the valve stem in a direction normal to the longitudinal axis by the interaction of the guide member and an interior surface of the spring housing.

DETAILED DESCRIPTION OF THE INVENTION

Figure 1:
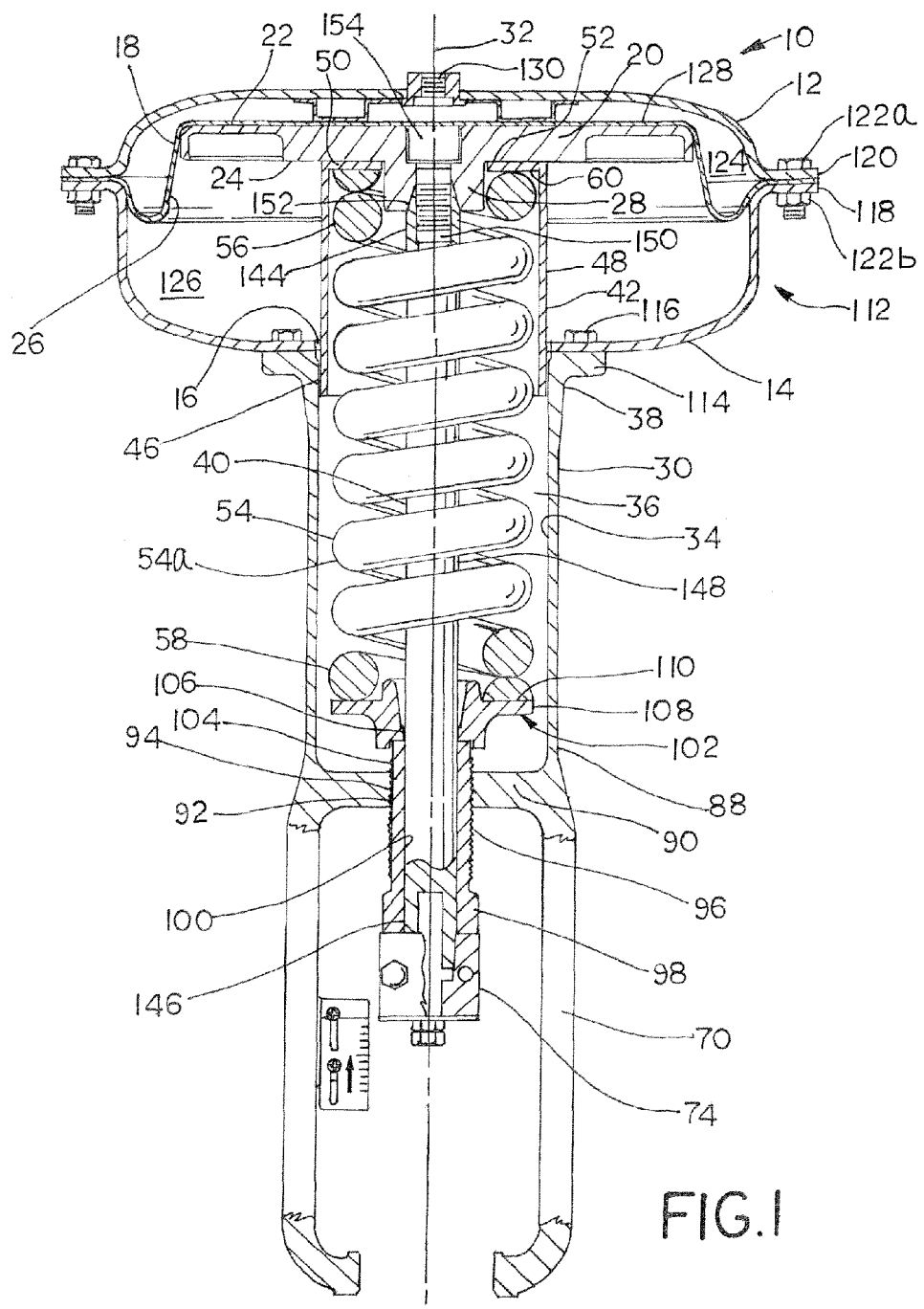
FIG. 1 is a sectional side view of an embodiment of a valve actuator assembly.

As illustrated in FIG. 1, a valve actuator assembly 10 includes an upper actuator casing 12 and a lower actuator casing 14 coupled to the upper actuator casing 12, and the lower actuator casing 14 includes a spring aperture 16. A diaphragm 18 is disposed between the upper actuator casing 12 and the lower actuator casing 14. The valve actuator assembly 10 also includes a diaphragm plate 20 disposed between the diaphragm 18 and the lower actuator casing 14, and the diaphragm plate 20 has a top surface 22 and a bottom surface 24. A lower surface 26 of the diaphragm 18 engages the top surface 22 of the diaphragm plate 20, and a stem projection 28 downwardly extends from the bottom surface 24 of the diaphragm plate 20. The valve actuator assembly 10 further includes a spring housing 30 that extends along a longitudinal axis 32. The spring housing 30 has an inner surface 34 defining an interior volume 36, and the spring housing 30 further includes an open first end 38, wherein the open first end 38 of the spring housing 30 is coupled to the lower actuator casing 14 adjacent to the spring aperture 16. An actuator stem 40 extends along the longitudinal axis 32 and is secured to the stem projection 28 of the diaphragm plate 20 such that a displacement of the diaphragm plate 20 results in a longitudinal displacement of the actuator stem 40. The actuator stem 40 extends through the spring aperture 16 of the lower actuator casing 14 and at least partially into the interior volume 36 of the spring housing 30.

Figure 3:
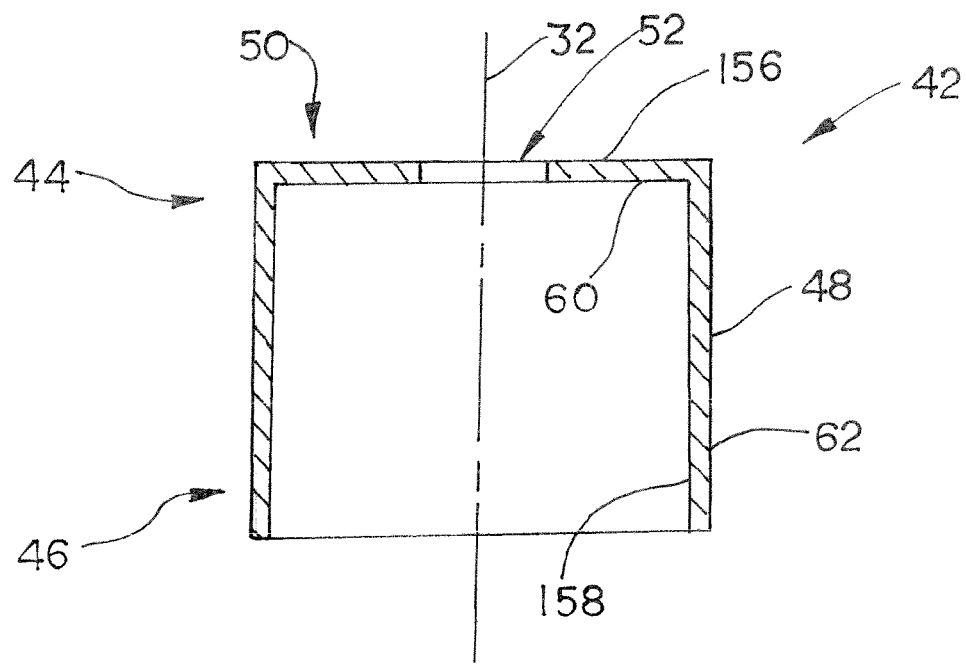
FIG. 3 is a sectional side view of an embodiment of a guide member.

Referring to FIGS. 1 and 3, the valve actuator assembly 10 additionally includes a guide member 42 having a first end 44 and a second end 46, the guide member 42 having a side wall 48 that extends along the longitudinal axis 32 from the first end 44 to the second end 46. The guide member 42 further includes a top wall 50 disposed normal to the longitudinal axis 32 at the first end 44 of the guide member 42, the top wall 50 having a center aperture 52. At least a portion of the side wall 48 adjacent to the second end 46 of the guide member 42 is received into the spring aperture 16 of the lower actuator casing 14 and within the interior volume 36 of the spring housing 30. As illustrated in FIG. 1, the valve actuator assembly 10 further includes a spring 54 having a first end 56 and a second end 58, with the second end 58 of the spring 54 being fixed relative to the spring housing 30 and the first end 56 of the spring 54 engaging a bottom surface 60 of the top wall 50 of the guide member 42. The spring 54 biases the top wall 50 of the guide member 42 into engagement with the bottom surface 24 of the diaphragm plate 20 such that the stem projection 28 is received into the center aperture 52 of the top wall 50 of the guide member 42.

So configured, an outer surface 62 of the side wall 48 of the guide member 42 is adapted to engage the inner surface 34 of the spring housing 30 to limit displacement of the diaphragm plate 20 and the actuator stem 40 in a direction normal to the longitudinal axis 32. This limitation (or prevention) of the displacement of the diaphragm plate 20 and the actuator stem 40 relative to the spring housing 30, the upper actuator casing 12, and/or the lower actuator casing 14 minimizes or prevents damage caused by contact between the diaphragm plate 20, the actuator stem 40, the spring housing 30, and/or the upper and lower actuator casings 12, 14.

Generally speaking, the valve actuator assembly 10 of the present disclosure may be used with any suitable control valve, such as, for example only, a stem-guided plug valve or a rotary valve. An example of such a control valve is provided in FIG. 2, which illustrates a cage-guided control valve 64. The control valve 64 may include a valve body 66, a bonnet 68 mounted on the valve body 66, and a yoke 70 mounted on the bonnet 68 and supporting the valve actuator assembly 10. A valve stem 72 may be disposed within the yoke 70, and a connection assembly 74 may couple the valve stem 72 to the actuator stem 40 that is itself coupled to the diaphragm plate 20. A top portion of the valve body 66 is provided with a flange base on which the bonnet 11 may be mounted, and through which the valve stem 72 may enter the body 10. The valve body 66 may provide a flow-through passage 82 from an inlet 76 to an outlet 78. By way of flanges 80a, 80b, the valve body 66 may be connected into a flow pipeline (not shown) to incorporate the flow-through passage 82 of the valve body into the flow pipeline. A fluid control member 84, such as a valve plug, may be disposed at an end of the valve stem 72 such that a longitudinal displacement of the diaphragm plate 20 results in a corresponding longitudinal displacement of the fluid control member 84 relative to a valve seat 86 disposed within the passage 82. As would be understood by someone of ordinary skill in the art, when the fluid control member 84 sealingly engages the valve seat 86, fluid is prevented from flowing from the inlet 76 to the outlet 78 of the control valve 64; however, when the fluid control member 84 is longitudinally displaced away from the valve seat 86, fluid may flow from the inlet 76 to the outlet 78 of the control valve 64.

Figure 2:
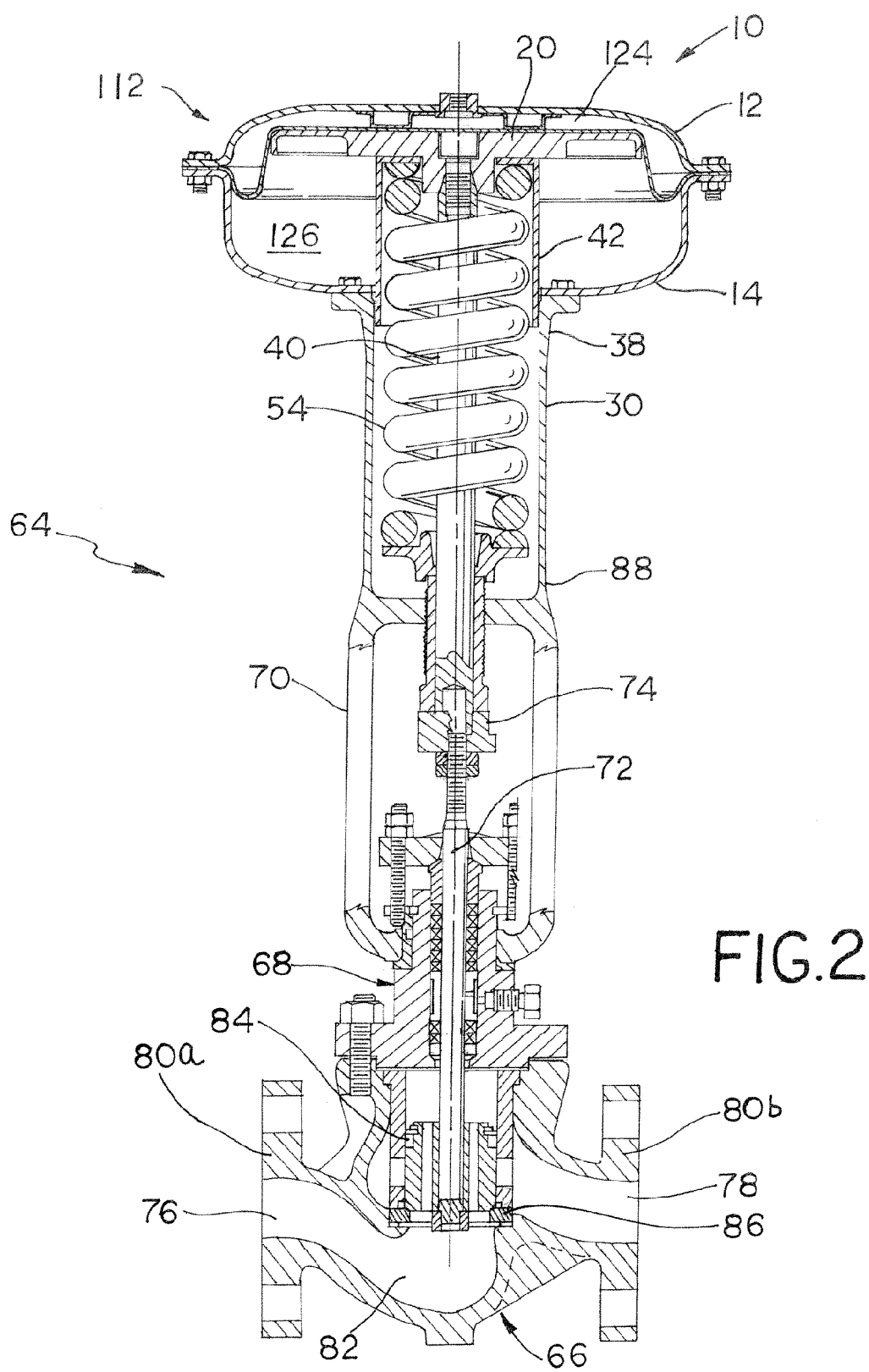
FIG. 2 is a sectional side view of an embodiment of the valve assembly of the present disclosure mounted to a control valve.

Still referring to FIG. 2, the valve actuator assembly 10 includes the spring housing 30, and the spring housing 30 may be any elongated cylinder that extends along the longitudinal axis 32 from the open first end 38 of the spring housing 30 to a second end 88. The second end 88 of the spring housing 30 may be coupled to any suitable portion of the control valve 64. For example, the second end 88 of the spring housing 30 may be coupled to (or integrally formed with) a top portion of the yoke 70. Alternatively, the second end 88 of the spring housing 30 may be coupled to (or integrally formed with) any portion of the control valve 64 that allows a user access to the connector assembly 74 coupling the actuator stem 40 to the valve stem 72. Referring to FIG. 1, the spring housing 30 may have an inner surface 34 that may define an interior volume 36. The inner surface 34 may have a uniform cross-sectional shape (when viewed along the longitudinal axis 32) from the first end 38 to the second end 88 of the spring housing 30. The inner surface 34 may have a circular cross-sectional shape when viewed along the longitudinal axis 32. However, the inner surface 34 may have any suitable cross-sectional shape or combination of shapes, such as that of an oval. The inner surface 34 may have a Teflon lining to reduce frictional engagement with the outer surface 62 of the side wall 48 of the guide member 42.

As illustrated in FIG. 1, a planar bottom wall 90 may be disposed at or adjacent to the second end 88 of the spring housing 30 of the valve actuator assembly 10. The bottom wall 90 may have a bottom bore 92 that may be defined by a cylindrical side wall 94 such that the cylindrical side wall 94 is coaxially aligned with the longitudinal axis 32. The surface of the cylindrical side wall 94 may be threaded, and the threaded surface of the cylindrical side wall 94 may engage a threaded outer surface 96 of a sleeve member 98 disposed within the bottom bore 92. The sleeve member 98 may be adjacent to the connector assembly 74, and the sleeve member 98 may be an elongated tube having a cylindrical inner surface 100 that slidingly receives the actuator stem 40. A spring seat 102 may be disposed at a first end 104 of the sleeve member 98. The spring seat 102 may include a central bore 106 that is coaxially aligned with the longitudinal axis 32, and the central bore 106 may slidingly receive the actuator stem 40. The spring seat 104 may further include a planar flange portion 108 that extends in a direction normal to the longitudinal axis 32, and a top surface 110 of the flange portion 108 may support the second end 58 of the spring 54. The spring seat 102 may be coupled to the first end 104 of the sleeve member 98 in any manner that allows a longitudinal displacement of the sleeve member 98 (caused by a relative rotation of the threaded outer surface 96 of the sleeve member 98 relative to the threaded surface of the stationary cylindrical side wall 94 of the bottom bore 92) to correspondingly longitudinally displace the spring seat 102. One having ordinary skill in the art would recognize that such a longitudinal displacement of the spring seat 102 would adjust (i.e., increase or decrease) the compression force provided by the spring 54.

Referring again to FIG. 1, the valve actuator assembly 10 also includes an actuator housing 112 coupled to the first end 38 of the spring housing 30, and the actuator housing 112 includes the upper actuator casing 12 and the lower actuator casing 14. The lower actuator casing 14 includes a spring aperture 16, and the spring aperture 16 and the inner surface 34 of the spring housing 30 may have the same cross-sectional shape when each is viewed along the longitudinal axis 32. For example, the spring aperture 16 and the inner surface 34 of the spring housing 30 may have a circular cross-sectional shape when each is viewed along the longitudinal axis 32, and the diameter of the spring aperture 16 may be slightly larger than the diameter of the inner surface 34 of the spring housing 30. The lower actuator casing 14 may be symmetrically (or substantially symmetrically) formed about the longitudinal axis 32, and, when viewed in cross-section along the longitudinal axis 32, the spring aperture 16 may be coaxially-aligned with the longitudinal axis 32. A top flange 114 may extend around the circumference of the first end 38 of the spring housing 30, and a plurality of bolts 116 may extend through apertures formed around the circumference of the spring aperture 16 and into corresponding apertures formed in the top flange 114 of the spring housing 30 to couple the lower actuator casing 14 to the spring housing 30. A top portion of the lower actuator casing 14 may have an annular flange 118, and the annular flange 118 may have a plurality of apertures circumferentially disposed around the annular flange 118. Each of the plurality of apertures may be coaxially-aligned with a corresponding aperture formed in an annular flange 120 formed on a bottom portion of the upper actuator casing 12. A bolt 122*a* may be received into each of the plurality of apertures of the annular flanges 118, 120, and a nut 122*b* may be threadedly coupled to a free end of each bolt 122*a* to secure the upper actuator casing 12 to the lower actuator casing 14.

Still referring to FIG. 1, the valve actuator assembly 10 may include the diaphragm 18, and the diaphragm 18 may be secured to the actuator housing 112 by any manner known in the art. For example, the diaphragm 18 may be secured to the actuator housing 112 by a clamping force provided between the annular flange 118 of the lower actuator casing 14 and the annular flange 120 of the upper actuator casing 12. So secured, the diaphragm 18 may separate an interior volume within the actuator housing 112 into a control pressure chamber 124 and a lower chamber 126, wherein the control pressure chamber 124 is formed between the upper actuator casing 12 and an upper surface 126 of the diaphragm 18 and the lower chamber 126 is formed between the lower actuator casing 14 and the lower surface 26 of the diaphragm 18. The control pressure chamber 124 receives a controlled pressure via an inlet port 130 to displace the diaphragm 18, and the control pressure chamber 124 is therefore a sealed volume (i.e., the control pressure chamber 124 is not in fluid communication with the atmosphere). Because the lower chamber 126 does not receive a controlled pressure, the lower chamber 126 is not a sealed volume (i.e., the lower chamber 126 is in fluid communication with the atmosphere such that the lower chamber is at atmospheric pressure). Said another way, the outer surface 62 of the side wall 48 of the guide member 42 may not be sealingly engaged with the spring aperture 16 of the lower actuator casing 14 or the inner surface 34 of the spring housing 30.

Figure 4:
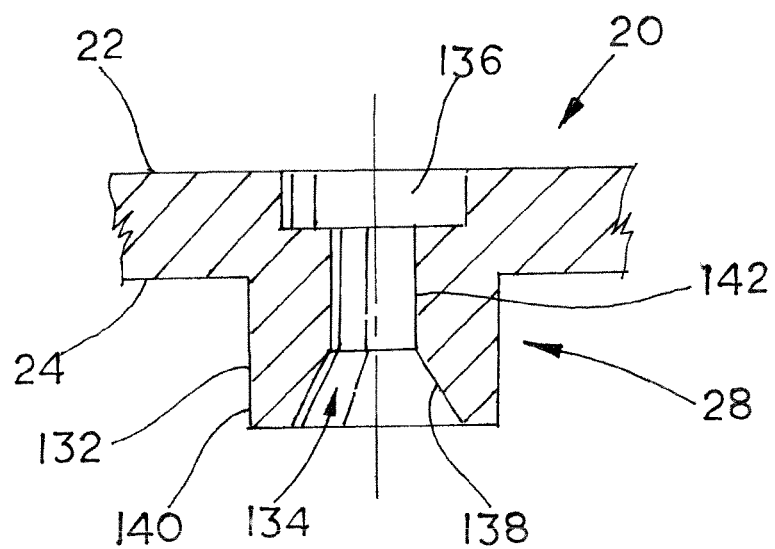
FIG. 4 is a partial sectional side view of an embodiment of a stem projection of a diaphragm plate, with the spring, the actuator stem, and the guide member omitted for clarity.

Referring again to FIG. 1, the valve actuator assembly 10 may include the diaphragm plate 20 disposed between the diaphragm 18 and the lower actuator casing 14 such that the diaphragm plate 20 is disposed in the lower chamber 126. The diaphragm plate 20 couples the diaphragm 18 to the actuator stem 40 and provides a rigid backing for the diaphragm 18. The diaphragm plate 20 may have the shape of a disk that is coaxially disposed with the longitudinal axis 32. The diaphragm plate 20 may have a top surface 22, and the top surface 22 may be planar or substantially planar. The lower surface 26 of the diaphragm 18 may engage the top surface 22 of the diaphragm plate 20 such that a suitable control pressure in the control pressure chamber 124 may displace the diaphragm into operative engagement with the top surface 22 of the diaphragm plate 20, thereby creating a downward (i.e., along the longitudinal axis 32 and towards the second end 88 of the spring housing 30) force on the diaphragm plate 20. The bottom surface 24 of the diaphragm plate 20 may be longitudinally offset from the top surface 22, and the bottom surface 24 may be planar or substantially planar. The diaphragm plate 20 may also include a stem projection 28 that may downwardly extend from the bottom surface 24 of the diaphragm plate 20. The stem projection 28 may any suitable cross-sectional shape or combination of shapes when viewed along the longitudinal axis 32. For example, the stem projection 28 may have a circular cross-sectional shape so as to form a cylindrical outer surface 132 that may be coaxially aligned with the longitudinal axis 32. The diameter of the outer surface 132 may be greater than a diameter of the actuator stem 40 and may be less than a minimum inner diameter of the spring 54 (e.g., a coil spring) as will be described in more detail below. Instead of a circular cross-sectional shape, the stem projection 28 may have any suitable cross-sectional shape. As illustrated in FIG. 4, a bore 134 may extend through the stem projection 28 and may be coaxially-aligned with the longitudinal axis 32. The bore 134 may have a cylindrical countersunk portion 136 adjacent to the top surface 22 of the diaphragm plate 20, a tapered portion 138 adjacent to a terminal end 140 of the stem projection 28, and a cylindrical intermediate portion 142 between the countersunk portion 136 and the tapered portion 138.

Referring again to FIG. 1, the valve actuator assembly 10 may include the actuator stem 40 extending along the longitudinal axis 32 and secured to the stem projection 28 of the diaphragm plate 20. More specifically, the actuator stem 40 may be an elongated rod having a first end 144 and a second end 146. The actuator stem 40 may have a circular cross-sectional shape when viewed along the longitudinal axis 32 such that the actuator stem 40 has a cylindrical outer surface 148, and the cylindrical outer surface 148 may be coaxially-aligned with the longitudinal axis 32. The actuator stem 40 may also include a blind bore 150 formed at the first end 144 of the actuator stem 40, and a tapered top portion 152 may be formed on the outer surface 148 at or adjacent to the first end 144 of the actuator stem 40. The blind bore 150 may be adapted to receive a fastener that removalby secures the diaphragm plate 20 to the actuator stem 40. For example, an interior surface of the blind bore 150 may be threaded to receive a fastener 154 having a threaded outer surface, and the threaded fastener 154 may be disposed within the bore 134 extending through the stem projection 28 to threadedly engage the blind bore 150. So secured, the tapered top portion 152 of the actuator stem 40 may be adjacent to or in contact with the tapered portion 138 of the bore 134 extending through the stem projection 28 of the diaphragm plate 20. The actuator stem 40 may extend through the spring aperture 16 of the lower actuator casing 14 and at least partially into the interior volume 36 of the spring housing 30. As previously discussed, the actuator stem 40 may be slidingly received within the central bore 106 of the spring seat 102 and the sleeve member 98. The second end 146 of the actuator stem 40 may be coupled to the connection assembly 74 by any means known in the art, including a threaded connection as illustrated in FIG. 1. Configured as described, a displacement of the diaphragm plate 20 may result in a longitudinal displacement of the actuator stem 40, which further results in a corresponding displacement of the fluid control member 84 towards or away from the valve seat 86.

Referring to FIGS. 1 and 3, the valve actuator assembly 10 may include the guide member 42, and the guide member 42 may extend along the longitudinal axis 32 such that the guide member 42 may have a first end 44 and an open second end 46. The guide member 42 may have a cup-like shape and may include the top wall 50 disposed at or adjacent to the first end 44 and a side wall 48 downwardly extending from the top wall 50. The top wall 50 may be planar or substantially planar, and the top wall 50 may be disposed normal to the longitudinal axis 32. A center aperture 52 may extend through the top wall 50. The center aperture 52 is adapted to receive the stem projection 28 and therefore may correspond in cross-sectional shape with the outer surface 132 of the stem projection 28. For example, if the outer surface 132 of the stem projection 28 has a circular cross-sectional shape when viewed along the longitudinal axis 32, the center aperture 52 may also have a circular cross-sectional shape when viewed along the longitudinal axis 32. In this configuration, a diameter of the outer surface 132 of the stem projection 28 may be 1% to 10% less than a diameter of the center aperture 52 of the top wall 50 of the guide member 42. The guide member 42 may be symmetrically (or substantially symmetrically) formed about the longitudinal axis 32, and, when viewed in cross-section along the longitudinal axis 32, the center aperture 52 may be coaxially-aligned with the longitudinal axis 32. So configured, the center aperture 52 may locate and center the guide member 42 about the stem projection 28 (and the actuator stem 40 that may be coaxially aligned with the stem projection 28).

As explained above, the side wall 48 of the guide member 42 may downwardly extend from the top wall 50 from the first end 44 to the second end 46, as illustrated in FIGS. 1 and 3. The outer surface 62 of the side wall 48 may correspond in cross-sectional shape to the cross-sectional shape of the inner surface 34 of the spring housing 30 (when view along the longitudinal axis 32) such that at least a portion of the side wall 48 adjacent to the second end 48 of the guide member 42 may be received into the spring aperture 16 of the lower actuator casing 14 and within the interior volume 36 of the spring housing 30. Accordingly, if the inner surface 34 of the spring housing 30 has a circular cross-sectional shape, the outer surface 62 of the side wall 48 may also have a circular cross-sectional shape such that the side wall 48 has a cylindrical shape. A diameter of the outer surface 62 of the cylindrical side wall 48 of the guide member 42 may be 1% to 10% less than a diameter of the inner surface 34 of the spring housing 30. A cylindrical inner surface 158 of the side wall 48 may be coaxially offset from the outer surface 62, and the diameter of the inner surface 62 may be greater than a maximum outer diameter of the spring 54 (e.g., a coil spring). As will be described in more detail below, the top surface 156 of the top wall 50 of the guide member 42 may be biased into contact with the bottom surface 24 of the diaphragm plate 20 by the spring 54. The longitudinal length of the side wall 48 of the guide member 42 may have any value that allows at least the second end 48 of the guide member 42 to be received into the interior volume 36 of the spring housing 30 when the diaphragm plate 20 is at a topmost first position (as illustrated in FIG. 1). The guide member 42 may be composed of high-strength alloy steel (e.g., stainless steel), a plastic (e.g., a hard plastic) or any other suitable material and may be made via machining, molding or any other suitable process(es). The guide member 42 may be formed as a single, unitary part or may be an assembly of two or more component parts.

Referring to FIG. 1, the valve actuator assembly 10 may further include the spring 54 at least partially disposed within the interior volume 36 of the spring housing 30. The spring 54 may be elongated and may be aligned with the longitudinal axis 32 such that the first end 56 of the spring 54 is adjacent to the stem projection 28 and the second end is adjacent to the second end 88 of the spring housing 30. More specifically, the top surface 110 of the flange portion 108 of the spring seat 102 may support the second end 58 of the spring 58 such that the second end 58 of the spring 54 is fixed relative to the spring housing 30. The spring 54 may be a coil spring 54a, and the coil spring 54a may be coaxially-aligned with the longitudinal axis 32 such that the coil spring 54a surrounds at least a portion of the actuator stem 40 and at least a portion of the stem projection 28 disposed through the center aperture 52 of the top wall 50 of the guide member 42. The coil spring 54a may have a maximum outer diameter and a minimum inner diameter. Because the diameter of the inner surface 62 of the cylindrical side wall 48 of the guide member 42 may be greater than the maximum outer diameter of the coil spring 54a and because the diameter of the outer surface 132 of the stem projection 28 may be less than the minimum inner diameter of the coil spring 54a, the first end 56 of the coil spring 54a may be inserted into the open second end 46 of the guide member 42 such that the first end 56 of the coil spring 54a engages the bottom surface 60 of the top wall 50 of the guide member 42 to bias the top surface 156 of the top wall 50 of the guide member 42 into engagement with the bottom surface 24 of the diaphragm plate 20.

Assembled as described, the first end 56 of the spring 54 engaging the bottom surface 60 of the top wall 50 of the guide member 42 biases the top surface 22 of the diaphragm plate 20 into the topmost first position illustrated in FIG. 1. In this topmost first position, at least a portion of the side wall 48 adjacent to the second end 46 of the guide member 42 is received into the spring aperture 16 of the lower actuator casing 14 and within the interior volume 36 of the spring housing 30. Also in this topmost first position, the stem projection 28 of the diaphragm plate 20 is disposed through the center aperture 52 of the top wall 50 of the guide member 42 to prevent (or limit) the movement of the guide member 42 relative to the diaphragm plate 20 in a transverse direction (i.e., a direction normal to the longitudinal axis 32), thereby rigidly coupling the guide member 42 to the diaphragm plate 20. So configured, the guide member 42 limits displacement of the diaphragm plate 20, the spring 54, and/or the actuator stem 40 in a transverse direction (i.e., a direction normal to the longitudinal axis 32). More specifically, when a transverse load (due to, for example, seismic forces) is applied to the actuator assembly 10, the diaphragm plate 20, the spring 54, and/or the actuator stem 40 may have a tendency to transversely displace relative to the actuator housing 112 and the spring housing 30. However, when the diaphragm plate 20, the spring 54, and/or the actuator stem 40 begin to transversely displace relative to the actuator housing 112 and/or the spring housing 30, the outer surface 62 of the side wall 48 of the guide member 42 engages the inner surface 34 of the spring housing 30 to limit the transverse displacement of the diaphragm plate 20, the spring 54, and/or the actuator stem 40.

When pressurized fluid is injected into the control pressure chamber 124 via the inlet port 130, a pressure differential across the diaphragm 18 forces the lower surface 26 of the diaphragm 18 to engage the top surface 22 of the diaphragm plate 20, thereby transferring a force from the pressurized fluid to the diaphragm plate 20. If the downward force acting on the diaphragm plate 20 is greater than the upward force provided by the spring 54, the diaphragm plate 20 and the actuator stem 40 downwardly displace, and the fluid control member 84 will correspondingly displace towards the valve seat 86 in the valve body 66. As the diaphragm plate 20 and the actuator stem 40 downwardly displace, the side wall 48 of the guide member 42 is received into the interior volume 36 of the spring housing 30. During such downward displacement, the outer surface 62 of the side wall 48 of the guide member 42 may be immediately adjacent to the inner surface 34 of the spring housing 30 or the outer surface 62 (or a portion of the outer surface 62) of the side wall 48 of the guide member 42 may slidingly engage the inner surface 34 of the spring housing 30. When control fluid is removed or exhausted from the control pressure chamber 124 such that the upward force on the diaphragm plate 20 provided by the spring 54 once again exceeds the downward force acting on the diaphragm plate 20 by the diaphragm 18, the diaphragm plate 20, the actuator stem 40, and the guide member 42 upwardly displace such that the outer surface 62 of the side wall 48 of the guide member 42 may be immediately adjacent to the inner surface 34 of the spring housing 30 or the outer surface 62 (or a portion of the outer surface 62) of the side wall 48 of the guide member 42 may slidingly engage the inner surface 34 of the spring housing 30.

Because the guide member 42 can be installed on the unpressurized side of the actuator housing 112, the guide member 42 would not require the use of a pressure seal to stabilize the actuator stem 40. In addition, one having ordinary skill in the art would recognize that the guide member's 42 location is closer to the center of gravity of the actuator assembly 10 than conventional upper guides that are disposed within the control pressure chamber 124 defined by the upper actuator casing 12 of the actuator housing 112, and, consequently, the guide member 42 has a minimal impact on the natural frequency of the actuator assembly 10. Because the guide member 42 uses existing surfaces as guides (such as the stem projection 28 of the diaphragm plate 30 and the inner surface 34 of the spring housing 30), no additional parts are necessary, and the guide member 42 may be retro-fitted to be used on existing actuator assemblies.

While various embodiments have been described above, this disclosure is not intended to be limited thereto. Variations can be made to the disclosed embodiments that are still within the scope of the appended claims.

What is claimed is:
1. A valve actuator assembly comprising:
an upper actuator casing;
a lower actuator casing coupled to the upper actuator casing, the lower actuator casing having a spring aperture;
a diaphragm disposed between the upper actuator casing and the lower actuator casing;
a diaphragm plate disposed between the diaphragm and the lower actuator casing, the diaphragm plate having a top surface and a bottom surface, wherein a lower surface of the diaphragm engages the top surface of the diaphragm plate, and wherein a stem projection downwardly extends from the bottom surface of the diaphragm plate;
a spring housing extending along a longitudinal axis, the spring housing having an inner surface defining an interior volume, the spring housing further having an open first end, wherein the open first end of the spring housing is coupled to the lower actuator casing adjacent to the spring aperture;
an actuator stem extending along the longitudinal axis and secured to the stem projection of the diaphragm plate such that a displacement of the diaphragm plate results in a longitudinal displacement of the actuator stem, the actuator stem extending through the spring aperture of the lower actuator casing and at least partially into the interior volume of the spring housing;
a guide member having a first end and a second end, the guide member having a side wall that extends along the longitudinal axis from the first end to the second end, the guide member further having a top wall disposed normal to the longitudinal axis at the first end of the guide member, the top wall having a center aperture, wherein at least a portion of the side wall adjacent to the second end of the guide member is received into the spring aperture of the lower actuator casing and within the interior volume of the spring housing;
a spring having a first end and a second end, the second end of the spring being fixed relative to the spring housing and the first end of the spring engaging a bottom surface of the top wall of the guide member, wherein the spring biases the top wall of the guide member into engagement with the bottom surface of the diaphragm plate such that the stem projection is received into the center aperture of the top wall of the guide member,
wherein an outer surface of the side wall of the guide member is adapted to engage the inner surface of the spring housing to limit displacement of the diaphragm plate and the actuator stem in a direction normal to the longitudinal axis, the outer surface of the side wall being free of any protrusions extending in the direction normal to the longitudinal axis.

2. The valve actuator assembly of claim 1, wherein the spring aperture and the inner surface of the spring housing have the same cross-sectional shape when each is viewed along the longitudinal axis.

3. The valve actuator assembly of claim 2, wherein the spring aperture and the inner surface of the spring housing each has a circular cross-sectional shape when viewed along the longitudinal axis.

4. The valve actuator assembly of claim 1, wherein the center aperture of the top wall of the guide member and an outer surface of the stem projection each has a circular cross-sectional shape when viewed along the longitudinal axis.

5. The valve actuator assembly of claim 4, wherein a diameter of the outer surface of the stem projection is 1% to 10% less than a diameter of the center aperture of the top wall of the guide member.

6. The valve actuator assembly of claim 1, wherein the outer surface of the side wall of the guide member and the inner surface of the spring housing each has the same cross-sectional shape when viewed along the longitudinal axis.

7. The valve actuator assembly of claim 6, wherein the outer surface of the side wall of the guide member and the inner surface of the spring housing each has a circular cross-sectional shape when viewed along the longitudinal axis.

8. The valve actuator assembly of claim 7, wherein a diameter of the outer surface of the side wall of the guide member is 1% to 10% less than a diameter of the inner surface of the spring housing.

9. The valve actuator assembly of claim 1, wherein the outer surface of the side wall of the guide member is not sealingly engaged with the spring aperture of the lower actuator casing or the inner surface of the spring housing.

10. The valve actuator assembly of claim 7, wherein an inner surface of the side wall of the guide member has a circular cross-sectional shape when viewed along the longitudinal axis, wherein the spring is a coil spring, and wherein a diameter of the inner surface of the side wall of the guide member is greater than a maximum outer diameter of the coil spring.

11. The valve actuator assembly of claim 10, wherein an inner diameter of the coil spring is greater than a diameter of an outer surface of the stem projection.

12. The valve actuator assembly of claim 1, wherein a bolt extends through the stem projection of the diaphragm plate and into a blind bore formed at a first end of the actuator stem to removably secure the actuator stem to the diaphragm plate.

13. The valve actuator assembly of claim 1, wherein air pressure within a volume defined by the upper actuator casing and an upper surface of the diaphragm causes the diaphragm plate, the actuator stem, and the guide member to longitudinally displace towards the second end of the spring, and wherein the spring opposes such longitudinal displacement.

14. The valve actuator assembly of claim 1, wherein a second end of the spring housing is coupled to a yoke of a control valve, and wherein the actuator stem is coupled to a valve stem that is coupled to a fluid control member disposed within a fluid passageway formed within the control valve.

* * * * *